United States Patent [19]
Meissner et al.

[11] Patent Number: 5,674,308
[45] Date of Patent: Oct. 7, 1997

[54] SPOUTED BED CIRCULATING FLUIDIZED BED DIRECT REDUCTION SYSTEM AND METHOD

[75] Inventors: David C. Meissner, Charlotte, N.C.; Kimio Sugiyama, Osaka, Japan; Isao Kobiyashi, Miki, Japan; Kenji Ohiraki, Akashi, Japan; Shintaro Ano, Kobe, Japan

[73] Assignee: Midrex International B.V. Rotterdam, Zurich Branch, Zurich, Switzerland

[21] Appl. No.: 527,772

[22] Filed: Sep. 13, 1995

Related U.S. Application Data

[60] Continuation-in-part of Ser. No. 399,449, Mar. 7, 1995, Pat. No. 5,529,291, which is a division of Ser. No. 289,852, Aug. 12, 1994, Pat. No. 5,431,711.

[51] Int. Cl.⁶ .............................. C21B 13/02; C22B 5/14
[52] U.S. Cl. .............................. 75/450; 266/172
[58] Field of Search .............................. 75/450; 266/172

[56] References Cited

U.S. PATENT DOCUMENTS

| | | | |
|---|---|---|---|
| Re. 32,247 | 9/1986 | Stephens, Jr. | 75/11 |
| 2,481,217 | 9/1949 | Hemminger. | |
| 2,821,471 | 1/1958 | Sellers | 75/26 |
| 2,864,686 | 12/1958 | Agarwal. | |
| 3,020,149 | 2/1962 | Old. | |
| 3,236,607 | 2/1966 | Porter, Jr. | |
| 3,246,978 | 4/1966 | Porter, Jr. | 75/26 |
| 3,251,677 | 5/1966 | Jolley. | |
| 3,251,678 | 5/1966 | Mayer. | |
| 3,257,198 | 6/1966 | Volk. | |
| 3,295,956 | 1/1967 | Whaley. | |
| 3,311,466 | 3/1967 | Curlook | 75/26 |
| 3,475,160 | 10/1969 | Heinzelmann | 75/26 |
| 3,565,790 | 2/1971 | Schwarzenbek | 208/153 |
| 3,591,363 | 7/1971 | Campbell. | |
| 3,944,413 | 3/1976 | Volk. | |
| 4,082,545 | 4/1978 | Malgarini. | |
| 4,134,907 | 1/1979 | Stephens, Jr. | 260/449.6 M |
| 4,257,781 | 3/1981 | Stephens, Jr. | 48/197 R |
| 4,260,412 | 4/1981 | Summers | 75/35 |
| 4,358,310 | 11/1982 | Sanzenbacher | 75/25 |
| 4,806,158 | 2/1989 | Hirsch. | |
| 5,073,194 | 12/1991 | Stephens | 75/376 |
| 5,082,251 | 1/1992 | Whipp | 266/142 |
| 5,118,479 | 6/1992 | Stephens, Jr. | 423/148 |
| 5,137,566 | 8/1992 | Stephens, Jr. | 75/507 |
| 5,185,032 | 2/1993 | Whipp. | |
| 5,192,486 | 3/1993 | Whipp | 266/156 |
| 5,370,727 | 12/1994 | Whipp. | |
| 5,382,277 | 1/1995 | Rose. | |
| 5,431,711 | 7/1995 | Meissner | 75/444 |
| 5,433,767 | 7/1995 | Bresser. | |
| 5,435,831 | 7/1995 | Meissner | 75/444 |
| 5,527,379 | 6/1996 | Hirsch et al. | 75/436 |

FOREIGN PATENT DOCUMENTS

| | | |
|---|---|---|
| 0571358 | 5/1993 | European Pat. Off. . |
| 2633691 | 3/1977 | Germany. |
| 4240194 | 6/1994 | Germany. |
| 4410093 | 3/1995 | Germany. |
| WO9202824 | 2/1992 | WIPO. |

OTHER PUBLICATIONS

Hirsch, Martin, Bresser, Wolfgang; Circofer—a concept of CFB reduction of fine ores with coal; *Metallurgical Plant and Technology International;* May 1993; pp. 42–47.

*Primary Examiner*—Melvyn Andrews
*Attorney, Agent, or Firm*—Ralph H. Dougherty, P.A.

[57] ABSTRACT

A method and apparatus for producing direct reduced iron from iron oxide fines. The iron oxide raw material are passed through a pre-heater having a spouted port then to a primary spouted bed circulating fluidizing bed reactor and then to a bubbling fluidizing bed reactor. The reaction of the strong reducing gas mixture, through this series of beds allows intimate contact between the fines and small particles with the reducing gas to facilitate the direct reduction of the iron oxide fines to metallized iron.

22 Claims, 3 Drawing Sheets

SPOUTED BED CIRCULATING FLUIDIZED BED DIRECT REDUCTION SYSTEM AND METHOD

CROSS REFERENCE TO RELATED APPLICATION

This application is a continuation-in-part of U.S. patent application Ser. No. 08/399,449, filed Mar. 7, 1995, now U.S. Pat. No. 5,529,291 which is a divisional of patent application Ser. No. 08/289,852, filed Aug. 12, 1994, now U.S. Pat. No. 5,431,711.

FIELD OF THE INVENTION

This invention relates to a process for reducing fine grain iron ore or iron oxide containing materials by treating these materials with gas containing hydrogen and carbon monoxide in a series of fluidized bed reactors of various types.

BACKGROUND OF THE INVENTION

A known method for reduction of iron oxide incorporates a unique $CO_2$ reforming technology for reducing gas production, and an associated shaft furnace reactor. This method, however, processes lump iron ore or pelletized iron oxide, and does not handle fine or powdered oxides. In the known method, reducing gas is fed to the shaft furnace, the gas moves counter currently through the descending burden of iron ore, reacts with iron oxide to form a partially spent top gas which is discharged from the top of the furnace. The discharged gas (top gas) still contains $H_2$ and CO, thus a large portion of it is recycled and used as a raw material for producing reducing gas again together with natural gas. The unique point of this process is that the natural gas can be reformed with $CO_2$ and $H_2O$ remaining in the top gas under nearly stoichiometric conditions and, consequently, there is no need to scrub water nor $CO_2$ from the reformed gas.

There is a second process for reduction of iron oxide (lump and pellet, or fine oxide) which utilizes reducing gas prepared outside of top gas recycle loop. In this second process, reducing gas is principally generated by a steam reforming method. Steam reforming requires excess $H_2O$ to prevent carbon deposition on the reforming catalyst, then requires excess water removal by condensation. As a result, steam reforming creates a large energy loss. In this process, $CO_2$ is scrubbed or removed from the recycled top gas and the top gas is then re-heated. The scrubbing of $CO_2$ and the re-heating of the top gas requires large energy consumption and may cause severe corrosion during the heating phase. A $CO_2$ removal unit requires large amounts of energy for regeneration of absorbent. CO in the top gas tends to decompose to carbon at a temperature range of about 500° C. to 650° C. The carbon penetrates into the heating tubes of the heater, resulting in severe corrosion of the heating equipment.

A third process is characterized by the reducing gas being mainly hydrogen. This process is proposed for reduction of fine or powdered iron oxide and is typically carried out by generating reducing gas with conventional steam reforming followed by shift conversion of CO and $H_2O$ to $CO_2$ and $H_2$, then $CO_2$ removal. In this case, the top gas is recycled after removing $H_2O$ and is heated up again with fresh reducing gas from outside the recycling loop. These steps are of significant disadvantages due to the energy loss for cooling down the gas and condensing water. Also, pure hydrogen attacks metal parts of the heater at high temperature.

In addition, reaction between hydrogen and iron oxide is endothermic and the heat necessary for reaction is only supplied by sensible heat of reducing gas. Heat from the exothermic reaction of CO and iron oxide can not be utilized in this case.

Some processes employ a fluidized bed reactor or reactors for reduction of fine or powder iron oxide. One example is a combination of three conventional fluidized bed reactors in series. Another example is a combination of a circulating fluidized bed reactor and a conventional fluidized bed reactor. In both cases, there are disadvantages that they need rather uniform size of iron oxide to stabilize fluidized bed layer, that there may be agglomeration of oxide, and frequent sticking of oxide on the equipment, especially on the reducing gas distributor.

DESCRIPTION OF THE PRIOR ART

Applicants are aware of the following U.S. Patents concerning fluidized beds used in the direct reduction of iron ore.

| U.S. Pat. No. | Inventor | Issue Date | Title |
| --- | --- | --- | --- |
| 2,821,471 | Sellers | 01-28-1958 | PROCESS FOR REDUCTION OF IRON ORE |
| 3,246,978 | Porter, Jr. | 04-19-1966 | FLUID BED PROCESS |
| 3,311,466 | Curlook | 03-28-1967 | REDUCTION OF METAL OXIDES |
| 3,475,160 | Heinzelmann | 10-28-1969 | METHOD OF PRODUCING REDUCING GASES FOR THE FLUIDIZED BED REDUCTION OF ORES |
| 3,565,790 | Schwarzenbek | 02-23-1971 | FLUID POWDER REACTION SYSTEM |
| 4,134,907 | Stephens, Jr. | 01-16-1979 | PROCESS FOR ENHANCING THE FUEL VALUE OF LOW BTU GAS |
| 4,257,781 | Stephens, Jr. | 03-24-1981 | PROCESS FOR ENHANCING THE FUEL VALUE OF LOW BTU GAS |
| 4,260,412 | Summers | 04-07-1981 | METHOD OF PRODUCING DIRECT REDUCTION IRON WITH FLUID BED COAL GASIFICATION |
| 4,358,310 | Sanzenbacher | 11-09-1982 | DRY COLLECTION OF METALLIZED FINES |
| 5,073,194 | Stephens | 12-17-1991 | PROCESS FOR CONTROLLING THE PRODUCT QUALITY IN THE CONVERSION OF REACTOR FEED INTO IRON CARBIDE |
| 5,082,251 | Whipp | 01-21-1992 | PLANT AND PROCESS FOR FLUIDIZED BED REDUCTION OR ORE |
| 5,118,479 | Stephens, Jr. | 06-02-1992 | PROCESS FOR USING FLUIDIZED BED REACTOR |
| 5,137,566 | Stephens, Jr. | 08-11-1992 | PROCESS FOR PREHEATING IRON-CONTAINING REACTOR FEED PRIOR TO BEING TREATED IN A FLUIDIZED BED REACTOR |
| 5,192,486 | Whipp | 03-09-1993 | PLANT AND PROCESS FOR FLUIDIZED BED REDUCTION OR ORE |
| Re. 32,247 | Stephens, Jr. | 09-16-1986 | PROCESS FOR THE DIRECT PRODUCTION OF STEEL |

-continued

| U.S. Pat. No. | Inventor | Issue Date | Title |
| --- | --- | --- | --- |
| Foreign Prior Art | | | |
| WO 92/02824 | Hager, et al. | 02-20-1992 | METHOD FOR CONTROLLING THE CONVERSION OF IRON CONTAINING REACTOR FEED INTO IRON CARBIDE |

Sellers, U.S. Pat. No. 2,821,471, teaches a process for the reduction of iron ore in the presence of hydrogen produced by the water gas shift conversion of carbon monoxide-containing gases. Carbon monoxide-containing gases are generated by the partial combustion of a carbonaceous fuel. In the process of the invention, at least a part of the raw ore to be reduced is passed first to a water gas shift conversion step to provide catalyst therein and is thereafter passed to a hydrogen reduction step.

Porter, Jr., U.S. Pat. No. 3,246,978, teaches a process and apparatus for the reduction of and the recycle of partially spent reducing gases and the combination of the recycled gases with freshly generated reducing gases to carry out reduction of the metal oxides. The metal oxides are treated at high temperatures with reducing gases containing carbon monoxide and hydrogen wherein the carbon monoxide and hydrogen are partially oxidized to carbon dioxide and water, cooling the hot partially oxidized gases, removing carbon dioxide, and water, recompressing the thus treated gases, reheating the gases and feeding them back to the reducing zone to prevent catastrophic carbonization, carbon deposition and equipment failure while reducing iron ore with a gas-containing carbon monoxide and hydrogen.

Curlook, U.S. Pat. No. 3,311,466, teaches an improved method for reducing granules of metal oxides such as nickel oxide while substantially avoiding fusion between granules and producing a uniform, granular and reactive metal product.

Heinzelmann, U.S. Pat. No. 3,475,160, teaches a process of manufacture or handling of carbon monoxide-containing reducing gases in contact with catalytic materials at certain temperatures which may result in the decomposition of carbon monoxide and the erosion of the catalytic surfaces. These problems can be minimized by producing the reducing gas by reforming hydrocarbon with oxygen containing gases in a reforming zone at pressures above 50 p.s.i.g. and temperatures between 800° F. and 1700° F., wherein the atomic ratio of oxygen/carbon is about 0.5–1.3 and the atomic ratio of hydrogen/carbon is at least about 6.5. The invention is particularly useful in reducing ores with reducing gases wherein a portion of the reducing gases are recycled through the reforming zone.

Schwarzenbek, U.S. Pat. No. 3,565,790, teaches a process and apparatus for containing a gas with a finely divided solids in a reactor. A suspension of the finely divided solids flows downwardly in the reactor.

Stephens, Jr. U.S. Pat. No. 4,134,907, teaches a process for increasing the fuel value of a gas mixture of carbon monoxide and hydrogen by converting part of the hydrogen and part of the carbon in the carbon monoxide of the gas mixture to methane, which comprises continuously introducing the gas mixture into a fluid bed in the presence of iron under conditions of pressure and temperature which promote the reduction of carbon monoxide to carbon, the formation of iron carbide from the iron and carbon, and the formation of methane and iron from iron carbide and hydrogen, and continuously removing from the fluid bed a methane enriched gas mixture including carbon monoxide and hydrogen having a substantially increased fuel value over the gas mixture introduced into the fluid bed.

Stephens, Jr. U.S. Pat. No. 4,257,781, teaches a process which uses coal resources more economically for industry by converting part of the hydrogen and part of the carbon in the carbon monoxide of the gas mixture to methane, by continuously introducing the gas mixture into a fluid bed in the presence of iron under conditions of pressure and temperature which promote the reduction of carbon monoxide to carbon, the formation of iron carbide from the iron and carbon, and the formation of methane and iron from iron carbide and hydrogen, and continuously removing from the fluid bed a methane enriched gas mixture including carbon monoxide and hydrogen having a substantially increased fuel value over the gas mixture introduced into the fluid bed.

Summers, U.S. Pat. No. 4,260,412, teaches a method of producing direct reduced iron with fluid bed coal gasification in which a portion of cooled, recycled gas is used as coolant in the gasification chamber and a second portion of the cleaned recycled gas is heated and mixed with the hot, dust-free gasification gas to form reducing gas for the direct reduction process. Limestone is preferably mixed with the pulverized coal feed to the gasification chamber to desulfurize the gas.

Sanzenbacher, U.S. Pat. No. 4,358,310, teaches a method and apparatus for the dry collection of metallized fines from a direct reduction furnace cooling zone in which cooling gas removed from the cooling zone passes through a dust collector and the removed dust is cooled in a fluidized bed, the fluidizing gas being recirculated through an indirect cooler. The process is continuous and the fines are collected at a sufficiently low temperature for easy handling. The apparatus includes a hot gas cyclone in the cooling gas withdrawal line connected to a fluidized bed cooler, a conduit for withdrawing fluidizing gas from the fluidized bed cooler passes through a second cyclone dust collector then through an indirect cooler and returns to the fluidized bed cooler. Cool fines are withdrawn from the fluidized bed cooler into a collector.

Stephens, U.S. Pat. No. 5,073,194, teaches a method of controlling product quality in a conversion of reactor feed to an iron carbidecontaining product in a fluidized bed reactor. A Mossbauer analysis is performed on product samples leaving the fluidized bed reactor, and a regression analysis is performed on the Mossbauer data. Depending upon the results of the regression analysis, process parameters are adjusted in order to obtain a product having a desired composition. Adjustments are made to the temperature and pressure in the fluidized bed reactor, rate of feed to the fluidized bed reactor, and the composition of the process gas which reacts with the reactor feed in the fluidized bed reactor, dependent upon the analysis results.

Whipp, U.S. Pat. No. 5,082,251, teaches an improved FIOR processing plant and method for reducing raw iron ore fines into a 90+% metallized briquette product which utilizes a multi-stage fluidized bed reactor in which the reducing and fluidizing gases are the products of partial combustion of methane with oxygen, the gases being introduced into an intermediate zone of the reducing tower above the stage or stages where final metallization occurs. The processing plant includes an ore preparation and feed assembly, a multi-stage reactor assembly, a briquetting assembly, a recycle and fresh reducing gas assembly, and a heat recuperation assembly.

Stephens, Jr., U.S. Pat. No. 5,118,479, teaches a process in which the fluidized bed reactor includes a baffle system to ensure the proper residence time of the feed materials. The fluidized bed reactor also provides a novel method for reducing the negative effects of thermal expansion in the reactor.

Stephens, Jr., U.S. Pat. No. 5,137,566, teaches a process for the conversion of reactor feed to iron carbide. The process includes the step of preheating the reactor feed in an oxidizing atmosphere. The iron carbide produced by the process is particularly useful in the production of steel.

Whipp, U.S. Pat. No. 5,192,486, teaches a process for an improved FIOR processing plant and method for reducing raw iron ore fines into a ninety plus percent metallized briquette product utilizing a multi-stage fluidized bed reactor in which the reducing and fluidizing gases are the products of partial combustion of methane with oxygen, the gases being introduced into an intermediate zone of the reducing tower above the stage or stages where final metallization occurs. The processing plant includes an ore preparation and feed assembly, a multi-stage reactor assembly, a briquetting assembly, a recycle and fresh reducing gas assembly, and, a heat recuperation assembly.

Stephens, Jr., U.S. Pat. Re. No. 32,247, teaches a process for the direct production of steel from particulate iron oxides or concentrates including two major steps in which in Step (1) the iron oxides are converted to iron carbide and in Step (2) steel is produced directly from the carbide in the basic oxygen furnace or the electric furnace. In the production of the carbide, the oxides are reduced and carburized in a single operation using a mixture of hydrogen as a reducing agent and carbon bearing substances such as propane primarily as carburizing agents. Iron carbide thus produced is introduced as all or part of the charge into a basic oxygen furnace to produce steel directly without the blast furnace step. In order to make the steel making process auto-thermal, heat is supplied either by using the hot iron carbide from Step (1) or preheating the iron carbide or by including sufficient fuel in the iron carbide to supply the required heat by combustion.

Hager, European Patent WO 92/02824, teaches a process for controlling the conversion of reactor feed to iron carbide. The reactor feed is subjected to a process gas in a fluidized bed reactor, and measurements are taken of individual gases in the off-gas from this reaction and the temperature and pressure. A stability phase diagram is generated based on the temperature. Different regions of the stability phase diagram are representative of different products being formed by the conversion of the reactor feed. Based on concentrations of the individual gases in the off-gas and the total pressure, a point is plotted on the stability phase diagram indicative of the favored reaction product. The process parameters can then be adjusted to insure that iron carbide can be produced from the reactor feed based on the stability phase diagram.

SUMMARY OF THE INVENTION

The present invention is an improved method and apparatus for processing fine ore particles. It is unique in its employment of a preheater and two reactors of different configuration in series. The preheater is a spouted circulating fluidized bed type, as is the first reactor bed. A second reactor is a multiple compartment bubbling bed reactor. By incorporating methane reforming with $CO_2$ and $H_2O$ in the top gas recycling loop, combining a spouted bed circulating fluidized bed reactor and a bubbling bed reactor, disadvantages of current processes are eliminated by the invented process.

According to the present invention, $CO_2$ removal is not necessary from the top gas nor from the reducing gas make-up. Water removal by condensing is not necessary from the reducing gas make-up. Heating of the reducing gas is not necessary. Hot gas from a methane reformer incorporated in the gas recycle line can be used directly. Then, neither carbon deposition nor carburization corrosion occurs during the course of the process. Hydrogen attack against metals does not occur as well, since the hot gas is simply transferred through refractory-lined ducts.

Combination of exothermic reaction and endothermic reaction are effectively utilized. Further, iron oxide having a wide range in particle size can be used in the spouted bed-circulating fluidized bed reactor, without requiring a gas distributor.

OBJECTS OF THE INVENTION

The principal object of the invention is to provide an improved method of reducing iron oxide fines.

A further object of this invention is to provide an efficient method of reducing iron oxide fines directly to iron, while maintaining high yield and avoiding movement of fines through the system without reduction.

Another object of the invention is to provide a method for direct reduction of fines which requires no reheating of the reducing gas after cooling for $CO_2$ and/or water removal.

Another object of the invention is to provide a method for direct reduction of fines which requires no water removal by condensing from the reducing gas make-up.

Another object of the invention is to provide a method for direct reduction of fines which requires no pre-heating of the reducing gas.

Another object of the invention is to provide an apparatus for direct reduction of fines utilizing hot reducing gas generated by the near stoichiometric reforming of methane with $CO_2$ and $H_2O$ in a reformer integrated in the top gas recycle line.

Another object of the invention is to provide a method for direct reduction of fines which handles a wide range of particle sizes.

BRIEF DESCRIPTION OF THE DRAWINGS

The foregoing and other objects will become more readily apparent by referring to the following detailed description and the appended drawings in which.

DETAILED DESCRIPTION

Figure 1:
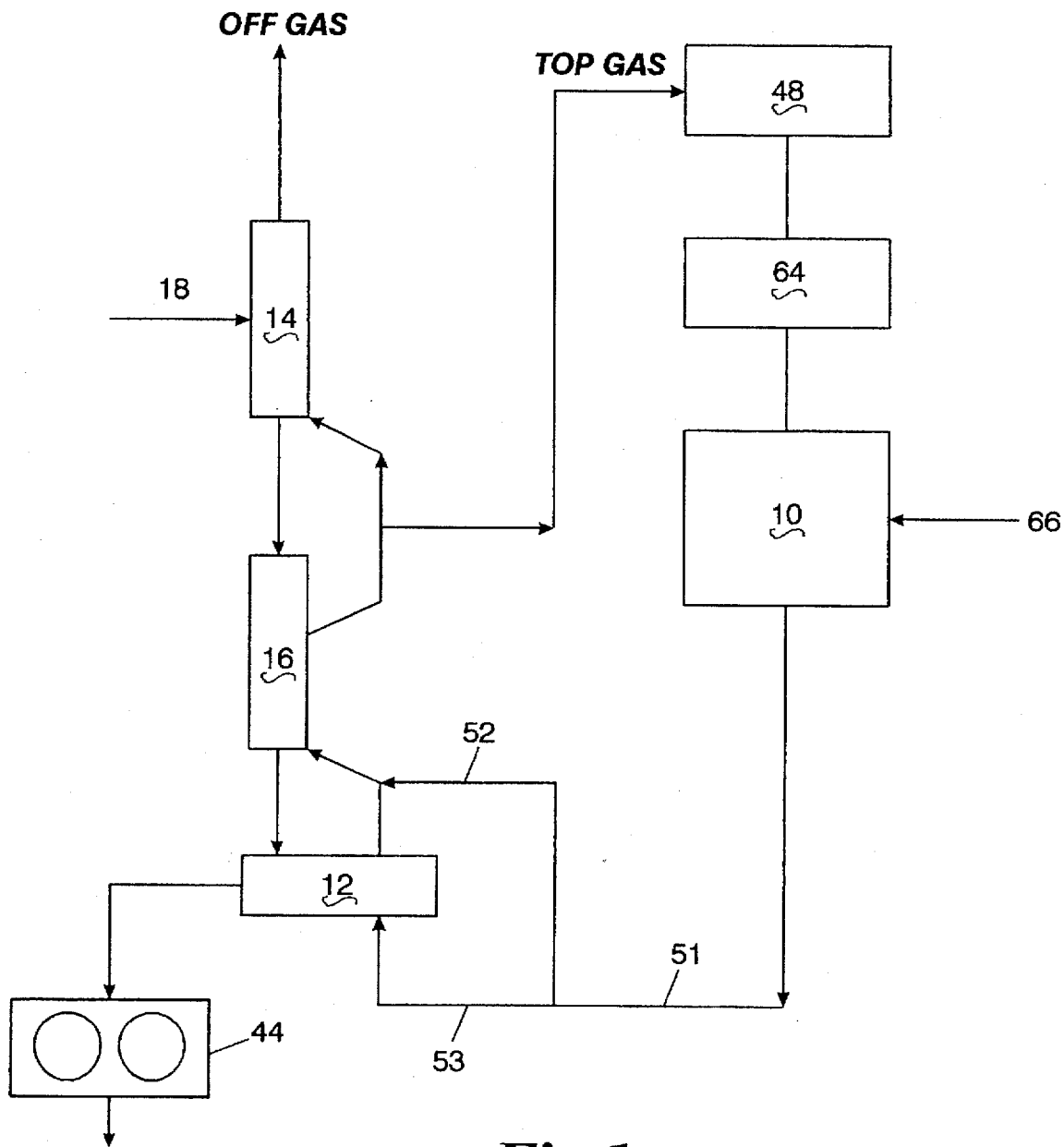
FIG. 1 is a schematic flow diagram of the invented process.

Referring now to FIG. 1, iron oxide fines from source 18, such as a hopper, are fed into a preheater 14, the output of which feeds a first stage reactor 16. Off gas from the first stage reactor 16 is removed and a portion of it is used in preheater 14 and a portion of it is recycled. The solid output of the first stage reactor 16 is fed to a second stage reactor 12, the solid output of which is then fed to an agglomerating device such as briquetter 44. Off gas from the second stage reactor is utilized in the first stage reactor as reducing gas. The removed top gas passes through scrubber 48 and compressor 64 and is then reformed with natural gas in reformer 10 to produce reducing gas. The gas from the reformer 10 is divided, a portion of it being utilized in the second stage reactor and a portion in the first stage reactor.

In this invention methane is reformed with $CO_2$ and $H_2O$ in the recycle loop of the top gas and nearly stoichiometric reforming is accomplished in the presence of catalyst in the reformer 10, FIG. 1. The reformed gas consists of mainly $H_2$ and CO, and its ratio is in the range of 1.5 to 2.5, preferably about 2.0, instead of about 1.5 as established for $CO_2$ reforming in lump iron oxide/shaft furnace process, since a greater amount of reducing gas is provided than is necessary to provide the necessary force for fluidizing iron oxide. This gas is charged directly to the second stage reactor 12 at about 800° C. to 850° C. Because of this high temperature and the exothermic reaction by CO, final reduction in the second stage reactor 12 is accomplished effectively.

Figure 3:
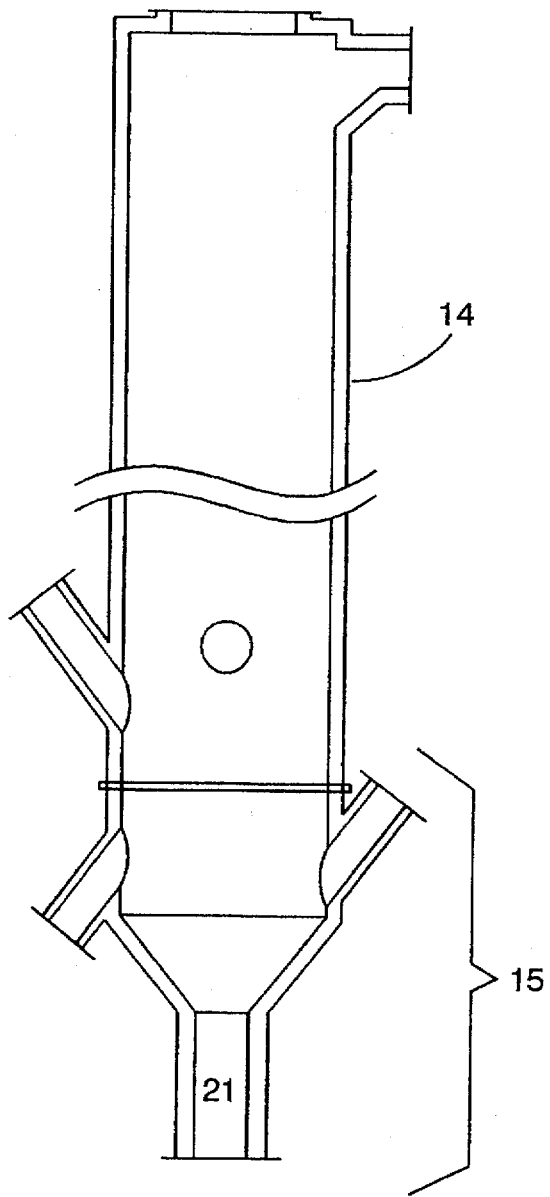
FIG. 3 is a cross sectional view of the preheater showing the spouted bed.
Figure 4:
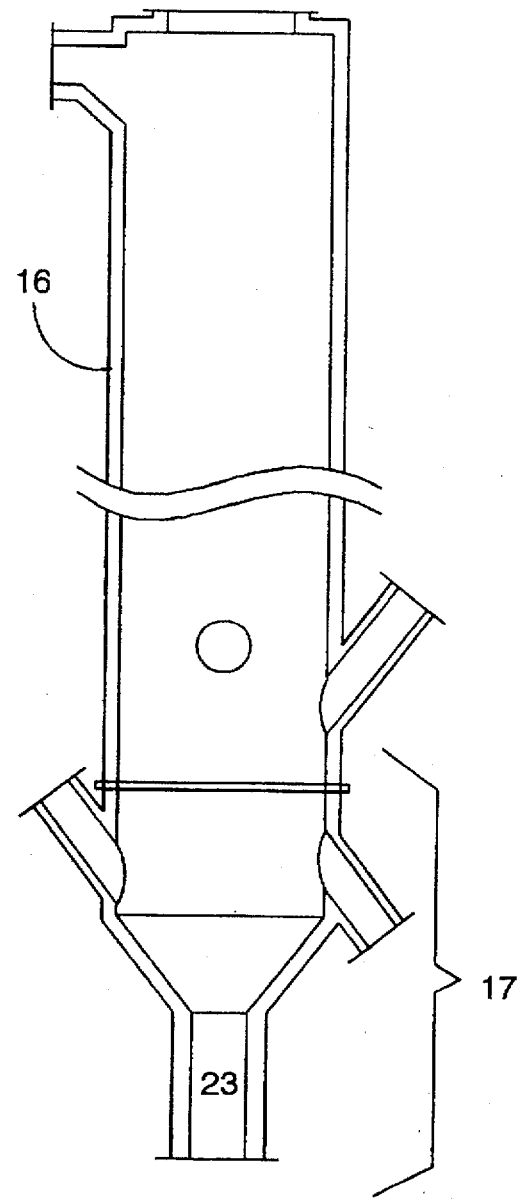
FIG. 4 is a cross sectional view of the first stage reactor showing the spouted bed.

Iron oxide tends to agglomerate at higher temperature, but this problem is solved by adequate rate of reduction achieved in each stage of the reactor, and by turbulent movement of iron oxide in the preheater 14 and the first stage reactor 16 due to their spouted bed geometry 15, FIG. 3, 17, FIG. 4. Geometric structure of the preheater is almost the same as the first stage reactor. While the dimensions of the preheater (e.g. inside diameter, height and spout) are smaller than the dimensions of the first stage reactor, the result is similar since the gas velocity inside the preheater 14 is kept as high as the gas velocity in the first stage reactor 16 despite its lower volume of gas. These spouts 15, 17, have no gas distributor. The full bore of the jet nozzle 21 of preheater 14, FIG. 3, and the full bore of the jet nozzle 23 of first stage reactor 16, FIG. 4, are used for the introduction of gas. A blast or jet of reducing gas is provided by these jet nozzles 21, 23. The combination of spouted bed and circulating flow of particles in these reactors allows treating iron oxide of wider size range. For example, all iron oxide smaller than 6 mm (18) can be used. Larger particles degrade by turbulent movement, crystal fracture, heating and reduction fragmentation. Smaller particles are blown out by the reducing gas from the top of the reactors, separated from the top gas in the cyclones, recycled to the reactors. Thus the size of iron oxide becomes uniform in these preheater 14 and first stage reactor 16 automatically thereby becomes very suitable to be fed to the second stage reactor 12 in which mild fluidization occurs during sufficient retention time for final reduction.

Figure 2:
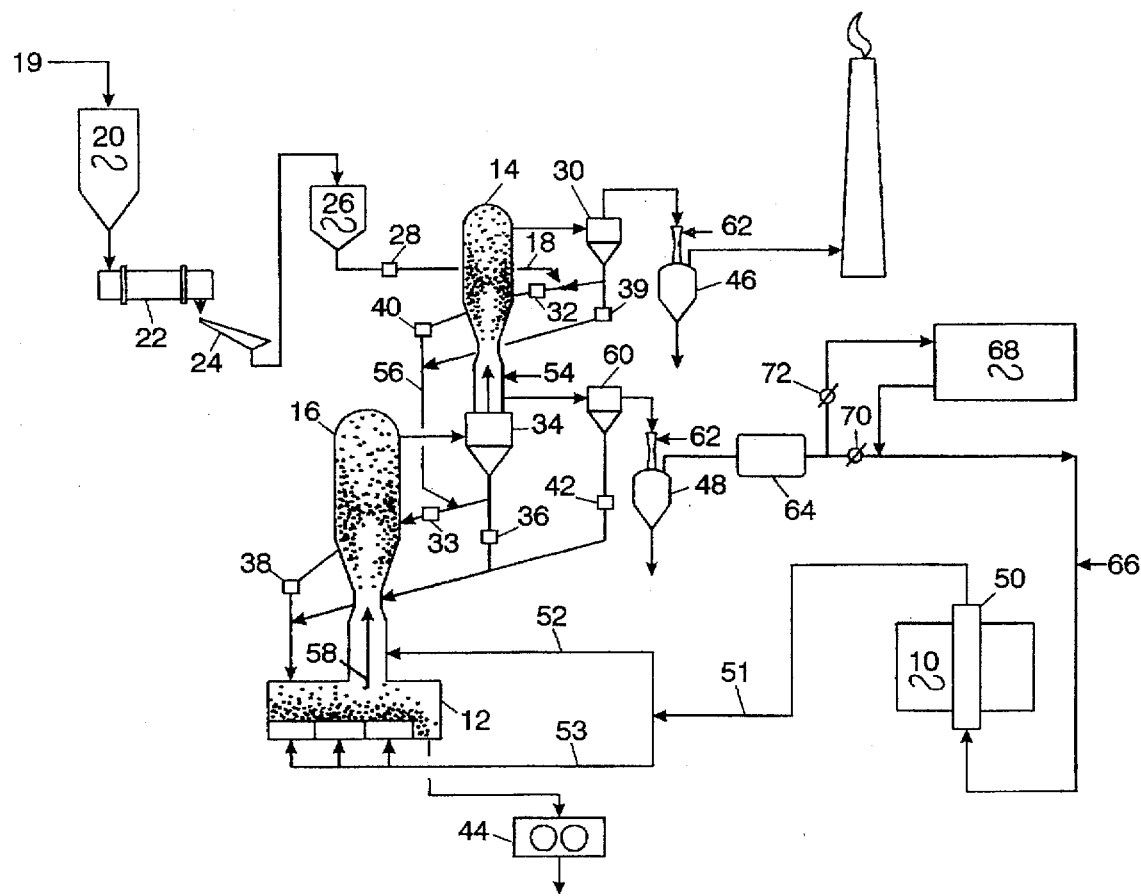
FIG. 2 is a schematic flow diagram of a direct reduced iron plant using the invented combined fluidized bed reduction process.

Iron oxide 19, FIG. 2, is deposited in hopper 20 then conveyed to a dryer 22 for drying. The dried fines are then screened by a screen 24 to minus 6 mm in size. This minus 6 mm iron oxide 18 is fed, through the hopper 26 and the feeder 28, to the preheater 14 for pre-heating and pre-reducing. The preheater 14 is of the spouted bed-circulating fluidized type. In the preheater 14, iron oxide contacts the reducing gas at 700° C. to 850° C. from the first stage reactor, and is heated up to about 500° C. to 600° C. and is simultaneously reduced by 1 to 8%.

Coarser material forms a concentrated lower layer at the bottom of the preheater. Fine material is blown out from the top of the preheater by the force of the spouted bed gas injection, caught in the first cyclone separator 30 and is fed back to the preheater 14 through circulation controller 32. A portion of the fine materials from the cyclone separator 30 and the coarse material from the bottom of the preheater are introduced into the respective discharge controllers 39 and 40, which controls their introduction into the first stage reactor 16.

Iron oxide discharged from the discharge controllers 39 and 40 is fed to the first stage reactor 16. In the first stage reactor, iron oxide reacts with the reducing gas at 800° C. to 850° C., which is a mixture of the gas from the second stage reactor and fresh reducing gas, and is reduced by 45 to 70%. Coarser material forms a concentrated layer of the bed at the bottom of the first stage reactor 16. Fine material is blown out from the top of the first stage reactor, caught in the second cyclone separator 34 and is mostly fed back to the first stage reactor 16 through circulation controller 33. A portion of the fine material from the second cyclone separator 34, the third cyclone separator 60, and coarse material from the bottom of the first stage reactor 16 are introduced into the respective discharge controllers 36, 38, and 42.

Iron oxide discharged from the discharge controllers 36, 38 and 42, are fed to the second stage reactor 12.

In the preheater 14 and first stage reactor 16, reducing gas is injected directly from their conical bottoms 15, 17, and a concentrated layer of coarse material is formed in each reactor while fine material forms an upper layer in the fluidized bed and blown out from the top of each reactor, separated in a cyclone separator and fed back to the respective reactor. At the bottom of each reactor, by turbulent movement of iron oxide, the oxide particles degrade into fines and do not stick to each other. Reference is made to FIGS. 3 and 4. There is no gas distributor in the preheater and first stage reactor. This also saves the cost of a distributor which may be made of expensive materials. As shown in FIG. 2, the bottoms of the preheater and the first stage reactor communicate with the following equipment, a second cyclone 34 and the second stage reactor 12 respectively, by straight connecting parts. These configurations prevent plugging by entrained particles in the partially spent reducing gas.

The second stage reactor 12 consists of multiple compartments. In this reactor, reducing gas is injected evenly through the distributor at about 800° C. to 850° C. and iron oxide contacts this gas by forming a fluidized bed layer. The movement of iron oxide is rather mild and there is sufficient retention time established to reduce iron oxide finally to more than the reduction degree of 93%.

In the second stage reactor 12, the violent turbulence of the earlier reactors is not necessary, since iron oxide has already been reduced about 45 to 70% before being fed to the second stage reactor and the tendency of agglomeration and sticking becomes less.

Reduced or metallized iron discharged from the second stage reactor 12 is normally fed to briquetting machines 44, as shown in FIG. 1.

Reducing gas from the first stage reactor still contains unreacted $H_2$ and CO at concentrations of about 50% and 20% respectively, and reacted $H_2O$ of about 15% and $CO_2$ of about 10%. A part of this gas, necessary to purge out $CO_2$ and inert gases such as $N_2$ which accumulates in the gas recycle loop, is fed to the preheater 14 for preheating and pre-reducing the particles, then is discharged from the process after being cooled and scrubbed in the first wet scrubber 46.

The remaining portion of the top gas is scrubbed of dust in the second water scrubber 48, while the content of $H_2O$ is adjusted by the scrubbing temperature. The cleaned top gas is mixed with natural gas, then is fed to the reformer.

In the reforming tube 50, a low activity catalyst is charged at the upstream end and high activity catalyst at the downstream end. The mixture of natural gas and top gas is reformed to produce fresh reducing gas 51 having a $H_2$ to CO ratio of 1.5 to 2.5, preferably 2.0 without any trouble such as carbon deposition on the catalyst.

EXAMPLES

Fine iron oxide 19 of the easily reductive type is first dried in the dryer 22 and then screened in screen 24 to eliminate the larger than 6 mm particles, and then stored in the oxide fines hopper 26. From the hopper 26, fine iron oxide 18 is fed at the rate of 57 tons per hour to the recycle line of the preheater 14, then together with recycled material into the preheater 14. A part of the spent gas from the reactors is introduced to the preheater. Before the gas enters the preheater, a small amount of air 54 is injected into the gas and by partial combustion the temperature of the gas rises to 832° C. The amount of the gas is 53,060 Nm3 per hour, and its pressure is 1.5 bar Atmosphere (hereinafter referred to as "bar A"). This gas has a quality of 2.72, where:

quality is defined as the ratio of $(H_2+CO)/(H_2O+CO_2)$.

In the preheater 14, fine iron oxide is preheated for about 30 minutes to 550° C. and pre-reduced to about 7.7% reduction.

The foregoing example is derived from a mathematical model which assumes no loss of fines from the system. However, it is normal for such a system to experience a loss of fines, which may occur at each scrubber.

The preheated and pre-reduced iron oxide is discharged from the preheater 14 by the discharge controllers 39 and 40 at the rate of 56.5 tons per hour, then fed to the recycle line 56 of the first stage reactor 16.

In the first stage reactor 16, fine iron oxide is fluidized by the reducing gas, which is introduced into the spout of the reactor at the rate of 142,700 Nm3 per hour, at 813° C. and 2.0 bar A. This reducing gas is a mixture of fresh reducing gas 52 and exhaust gas 58 from the second stage reactor 12 and has quality of 6.02. In this reactor, the fine oxide is reduced to 64.8% reduction. The retention time in this reactor 16 is one and a half hours.

The partly metallized fine iron oxide is discharged from the first stage reactor 16 by the discharge controllers 36 and 38 at the rate of 46.7 tons per hour, then fed to the second stage reactor 12.

In the second stage reactor 12, with a retention time of one and a half hours, fine iron oxide is reduced to 95.22% metallization by the reducing gas 53 of 105,770 $Nm^3$ per hour, 825° C., 2.4 bar A. In this stage, reducing gas has a higher quality of 11.15, which is directly supplied from the reformer 10.

A smaller portion of the top gas from the first stage reactor 16 through the cyclone separator 34 is sent to the preheater 14 as mentioned above and the larger remaining portion to another cyclone 60. This latter amount is 93,600 $Nm^3$ per hour at 709° C. and 1.6 bar A. Its quality is already 3.09. This gas goes to the scrubber 48, where dust is removed and $H_2O$ content is adjusted by the temperature of the water 62 to make it suitable for reforming natural gas, then the gas is mixed with natural gas 66. This mixture then reacts in the reformer catalyst tubes 50 and forms the reducing gas having $H_2/CO$ ratio of 2.05.

ALTERNATIVE EMBODIMENTS

At times the use of ore having a sulfur content is either desirable or cannot be avoided. The present system can be modified to deal with ore having a high sulfur content. After the spent reducing gas is discharged from scrubber 48, FIG. 2, and after the compressor 64 this process can include a desulfuring step 68 which is controlled by optional valves 70 and 72. In operation when ore is used that contains sulfur valve 70 is shut off and valve 72 is opened which forces this spent gas into an apparatus structurally arranged to treat sulfur such as a liquid absorption wet scrubber, a wet solids bed, a solid active catalyst, or a bed of zinc oxide. After treatment the gas is pulled into the compressor for regeneration as fresh reducing gas.

SUMMARY OF THE ACHIEVEMENT OF THE OBJECTS OF THE INVENTION

From the foregoing, it is readily apparent that we have invented an improved method and apparatus for reducing iron oxide fines and small particles to a high degree of metallization. The invention provides an efficient method of reducing iron oxide fines directly to iron, while producing reducing gas in the integrated loop of the gas recycle in which ideal nearly stoichiometric reaction is realized, with no $CO_2$ removal from fresh reducing gas nor recycled gas with no $H_2O$ removal from fresh reducing gas and while introducing hot and highly reducing gas into reactors. Further improvements of this method include not requiring water removal by condensing from the reducing gas make-up nor pre-heating of the reducing gas. The invention also comprehends apparatus for the direct reduction of fines utilizing hot gas from the methane reformer in the gas recycle line.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. Apparatus for the direct reduction of iron oxide fines comprising:

(a) a means for generating a reducing gas by reforming natural gas with spent reducing gas;

(b) a source of particulate iron oxide including fines;

(c) a means for conveying iron oxide fines to a preheater;

(d) a spouted bed circulating fluidized bed preheater;

(e) a first cyclone communicating with said spouted bed circulating fluidized bed pre-heater;

(f) a first means for conveying reducing gas to said spouted bed circulating fluidized bed pre-heater;

(g) said pre-heater communicating with a first stage spouted bed circulating fluidized bed reactor;

(h) a second cyclone communicating with said first stage spouted bed circulating fluidized bed reactor;

(i) a third cyclone communicating with said second cyclone;

(j) a wet scrubber communicating with said third cyclone;

(k) a second means for conveying reducing gas to said first stage spouted bed circulating fluidized bed reactor;

(l) said first stage spouted bed circulating fluidized bed reactor communicating with a second stage reactor which is of bubbling bed fluidized bed;

(m) a third means for conveying reducing gas to said second stage reactor; and (n) said second stage reactor communicating with a means for collecting metallized iron fines.

2. Apparatus according to claim 1, further comprising a wet scrubber communicating with said first cyclone.

3. Apparatus according to claim 1, wherein the spouted bed of said pre-heater is provided with a spout having a jet nozzle.

4. Apparatus according to claim 1, wherein the spouted bed of said first stage reactor is provided with a spout having a jet nozzle.

5. Apparatus according to claim 1, wherein said first means of conveying reducing gas is a straight connecting part.

6. Apparatus according to claim 1, wherein said second means for conveying reducing gas is a straight connecting part.

7. Apparatus according to claim 1, further comprising a particulate agglomeration means communicating with said means for collecting metallized fines.

8. Apparatus according to claim 7, wherein said particulate agglomeration means is a briquetter.

9. Apparatus according to claim 1, further comprising a means for removing sulfur communicating with said wet scrubber and said means for generating a reducing gas.

10. Apparatus according to claim 9, wherein said means for removing sulfur is selected from the group consisting of wet liquid absorption scrubbers, a bed of wet solids, a bed of zinc oxide, and combinations thereof.

11. A method for reducing iron oxide from a source of fines, comprising the following steps:

(a) scrubbing spent $CO_2$- and $H_2O$-containing reducing gas and adjusting the moisture content of said spent reducing gas in a scrubber to form scrubbed gas;

(b) conveying said scrubbed gas to a reformer;

(c) generating reducing gas in the reformer by reforming methane with $CO_2$ and $H_2O$ from said scrubbed gas;

(d) conveying iron oxide fines to a preheater;

(e) fluidizing and circulating iron oxide fines with a partially spent reducing gas;

(f) preheating and pre-reducing said iron oxide fines and forming a spent gas;

(g) separating iron oxide fines from said spent gas;

(h) conveying pre-heated and pre-reduced iron oxide fines to a first stage reactor;

(i) fluidizing and circulating iron oxide fines with said reducing gas in combination with exhaust gas from a second stage reactor;

(j) reducing said iron oxide fines to partially metallized iron fines and forming a first partially spent reducing gas;

(k) separating partially metallized iron fines from said first partially spent reducing gas;

(l) conveying the partially metallized iron fines to a second stage reactor;

(m) conveying a portion of the partially spent reducing gas to a pre-heater and a portion of the partially spent reducing gas to said scrubber;

(n) fluidizing the partially metallized iron fines with said reducing gas;

(o) reducing the partially metallized iron fines to reduced metallized iron fines and forming a second partially spent reducing gas;

(p) conveying said second partially spent reducing gas to a first stage reactor; and (q) collecting reduced metallized iron fines.

12. A method according to claim 11 further comprising preheating and partially oxidizing the partially spent reducing gas of step (e) by air injection.

13. A method according to claim 11, wherein the particle size of the iron oxide fines is less than 6 mm.

14. A method according to claim 11, wherein preheating of iron oxide fines is carried out at a temperature of about 500° C. to about 600° C. in a preheater.

15. A method according to claim 11, wherein iron oxide is pre-reduced to about 1% to about 8% reduction during preheating.

16. A method according to claim 11, wherein iron oxide is partially reduced to about 45% to about 70% reduction in the first stage reactor.

17. A method according to claim 11, wherein metallized iron fines are reduced more than 93% reduction.

18. A method according to claim 11, wherein reducing gas is mainly composed of hydrogen and carbon monoxide having a hydrogen to CO composition ratio of about 1.5 to about 2.5.

19. A method according to claim 11, further comprising agglomerating the reduced metallized iron fines.

20. A method according to claim 11, further comprising briquetting the reduced metallized iron fines.

21. A method according to claim 11, further comprising a step of treating said scrubbed gas with a means of removing sulfur before reforming.

22. A method according to claim 21, wherein said means of of removing sulfur comprises passing said gas through a media selected from the group consisting of a wet liquid absorption scrubber, a bed of wet solids, a bed of zinc oxide, or any combination thereof.

* * * * *

UNITED STATES PATENT AND TRADEMARK OFFICE
CERTIFICATE OF CORRECTION

PATENT NO. : 5,674,308
DATED : October 7, 1997
INVENTOR(S) : Meissner, et. al.

It is certified that error appears in the above-identified patent and that said Letters Patent is hereby corrected as shown below:

Title page, item [75] inventor: change "Isao Kobiyashi" to -- Isao Kobayashi --.

Signed and Sealed this

Twentieth Day of October, 1998

Attest:

BRUCE LEHMAN

Attesting Officer     Commissioner of Patents and Trademarks